United States Patent
Gugliemino et al.

(10) Patent No.: US 9,170,737 B1
(45) Date of Patent: Oct. 27, 2015

(54) PROCESSING DATA STORAGE SYSTEM CONFIGURATION INFORMATION

(75) Inventors: Joseph Gugliemino, Berlin, MA (US); Brian A. Castelli, Fuquay Varina, NC (US); Stephen J. Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 543 days.

(21) Appl. No.: 12/570,136

(22) Filed: Sep. 30, 2009

(51) Int. Cl.
G06F 13/00 (2006.01)
G06F 13/28 (2006.01)
G06F 3/06 (2006.01)

(52) U.S. Cl.
CPC ............ *G06F 3/0604* (2013.01); *G06F 3/0629* (2013.01); *G06F 3/0689* (2013.01)

(58) Field of Classification Search
CPC .... G06F 3/0604; G06F 3/0629; G06F 3/0689
USPC ............... 711/170, 112, E12.084; 713/1, 100
See application file for complete search history.

(56) References Cited

U.S. PATENT DOCUMENTS

| | | | |
|---|---|---|---|
| 7,107,534 B1 * | 9/2006 | de Jong et al. | 715/734 |
| 8,140,475 B1 * | 3/2012 | Sparks | 707/634 |
| 2004/0006612 A1 * | 1/2004 | Jibbe et al. | 709/223 |
| 2007/0162684 A1 * | 7/2007 | Kalos et al. | 711/100 |
| 2007/0260712 A1 * | 11/2007 | Jibbe | 709/220 |
| 2010/0312540 A1 * | 12/2010 | Jess | 703/21 |

\* cited by examiner

*Primary Examiner* — Edward Dudek, Jr.
(74) *Attorney, Agent, or Firm* — John T. Hurley; Jason A. Reyes; Krishnendu Gupta

(57) ABSTRACT

A method is used in processing data storage system configuration information. A capture tool is used to create a template from a configuration of a first data storage system. The template is published, and a configuration engine is used to apply the template to configuring a second data storage system.

20 Claims, 13 Drawing Sheets

```xml
<contextInfo>
    <systemID id="12345"/>
    <user id="anne_s"/>
  602
    <status code="00056" subCode="123"/>
  604
    <capacity totalCapacity="1099511627776" freeCapacity="9995116277776"/>
  605
    <applicationList>
        <application type="Exchange" name="ExchangeServer1"/>
  606
        <application type="Folders" name="home"/>
    </applicationList>
    <configuration>
        <diskList>
            <disk type="VENDOR A" size="146GB" speed="15K" slot="1" status="1"/>
            <disk type="VENDOR B" size="300GB" speed="10K" slot="2" status="1"/>
            <disk type=" VENDOR B " size="300GB" speed="10K" slot="3" status="1"/>
  608      <disk type="VENDOR B" size="300GB" speed="10K" slot="4" status="1"/>
            <disk type="VENDOR B" size="300GB" speed="10K" slot="5" status="1"/>
            <disk type="VENDOR B" size="300GB" speed="10K" slot="6" status="1"/>
            <disk type="VENDOR B" size="300GB" speed="10K" slot="7" status="1"/>
        </diskList>
    </configuration>
</contextInfo>
```

| | |
|---|---|
| USER ID | 622 |
| USER CONTACT INFORMATION | 624 |
| LICENSE INFORMATION | 626 |
| SUPPORT AND SERVICE CONTRACT INFORMATION | 628 |
| SERVICE CALL AND PROBLEM HISTORY | 630 |
| DATA STORAGE INFORMATION (HARDWARE AND/OR SOFTWARE; CONFIGURATION, CAPACITY) | 632 |
| WEBSITE ACTIVITY INFORMATION (DOWNLOAD PAPER, WEBSITE QUERY) | 634 |
| LIVE CHAT SUPPORT | 636 |
| PHONE SUPPORT | 638 |
| USER COMMUNITY INFORMATION | 640 |
| • • • • | |

FIG. 7A

PROCESSING DATA STORAGE SYSTEM CONFIGURATION INFORMATION

BACKGROUND

1. Technical Field

This application relates to processing data storage system configuration information.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Different tasks may be performed in connection with a data storage system. For example, software may be executed on the data storage system in connection with performing data storage administration tasks such as for data storage configuration, management, and/or monitoring.

Configuration information may be associated with a data storage system. The configuration information may include information describing the physical and/or logical configuration in the data storage system. The logical configuration information may include, for example, information regarding RAID groupings, logically defined devices, and the like. There are times when it may be useful to replicate the configuration information from one data storage system such as, for example, for use in connection with configuring another data storage system. Existing techniques include manually extracting the configuration information for the data storage system from a storage location of the configuration information. Such a process is often cumbersome, time consuming and error prone.

SUMMARY OF THE INVENTION

A method is used in processing data storage system configuration information. A capture tool is used to create a template from a configuration of a first data storage system. The template is published, and a configuration engine is used to apply the template to configuring a second data storage system.

BRIEF DESCRIPTION OF THE DRAWINGS

Features and advantages of the present invention will become more apparent from the following detailed description of exemplary embodiments thereof taken in conjunction with the accompanying drawings in which:

FIGS. 6 and 7 are examples of context information;

FIG. 7A is an example representation of user profile information;

DETAILED DESCRIPTION OF EMBODIMENT(S)

Described below is a configuration information management technique that may be used to help with configuration generation, collection, and distribution via an ecosystem which is described below and in U.S. patent application Ser. No. 12/286,434, filed Sep. 29, 2008, CONTROLLING INFORMATION ABOUT A DATA STORAGE SYSTEM RETURNED TO AN END-USER, Liberty et al., which is hereby incorporated herein by reference in its entirety. In an example as described below, the technique uses a capture tool and a configuration engine with the ecosystem. The capture tool can be used to create a template from the configuration of a storage system, optionally edit the template, and download or publish the configuration. The operation of the capture tool is optionally customized or controlled by a script or rules file. The configuration engine is used within the storage system for the generation and consumption of templates. The operation of the configuration engine is optionally customized or controlled by a script or rules file. The template can be posted or advertised via the capture tool so that it is available to ecosystem-enabled graphical user interfaces (GUIs), and the template can be downloaded and the storage system can be auto-configured at the user's site via the GUI.

Conventionally, configuration is performed manually on a per-system basis such that a customer, partner, or field service person goes through configuration steps manually or writes a custom script for use on site, which is time-consuming, prone to error, and not necessarily repeatable.

By contrast, the configuration information management technique can help bring automation, control, and distribution to the product life cycle. The capture tool, working in conjunction with the configuration engine and the ecosystem, can be used to capture and create custom configurations that can be modified, distributed, and installed in such a way that the customer realizes shorter install times, consistent performance and fewer errors.

Figure 1:
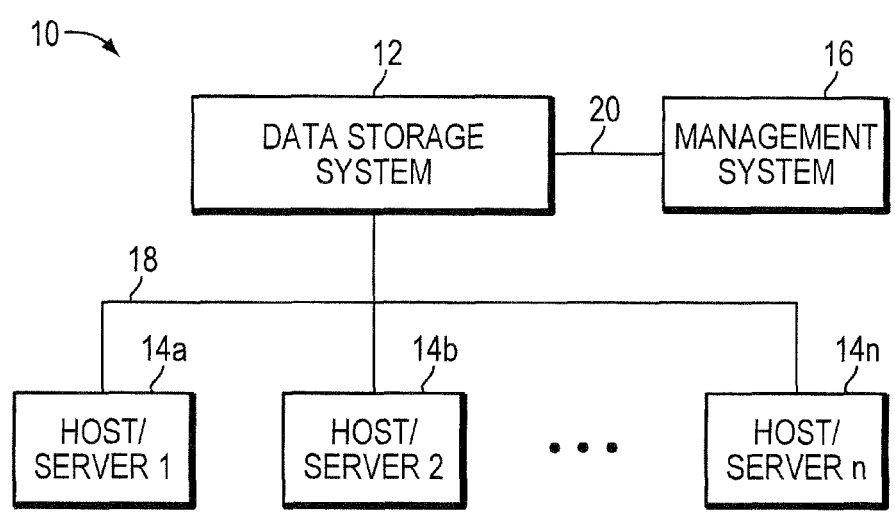
FIG. 1 is an example of an embodiment of a system that may utilize the techniques described herein.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with configuring the data storage for use by the hosts in connection with techniques described herein. As an example in connection with an email application server component that may executed on the hosts 14a-14n, the data storage configuration tasks may include allocating storage for user accounts or mailboxes, specifying the devices (logical and/or physical) used to store the email data, specifying whether data replication is performed for disaster recovery, and the like. Techniques that may be used in connection with performing data storage configuration and configuration tasks are described in more detail in following paragraphs in order to provide ease of use to customers of the data storage system(s) 12.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for processing a data storage configuration request.

Servers or host systems, such as 14*a*-14*n*, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Figure 2:
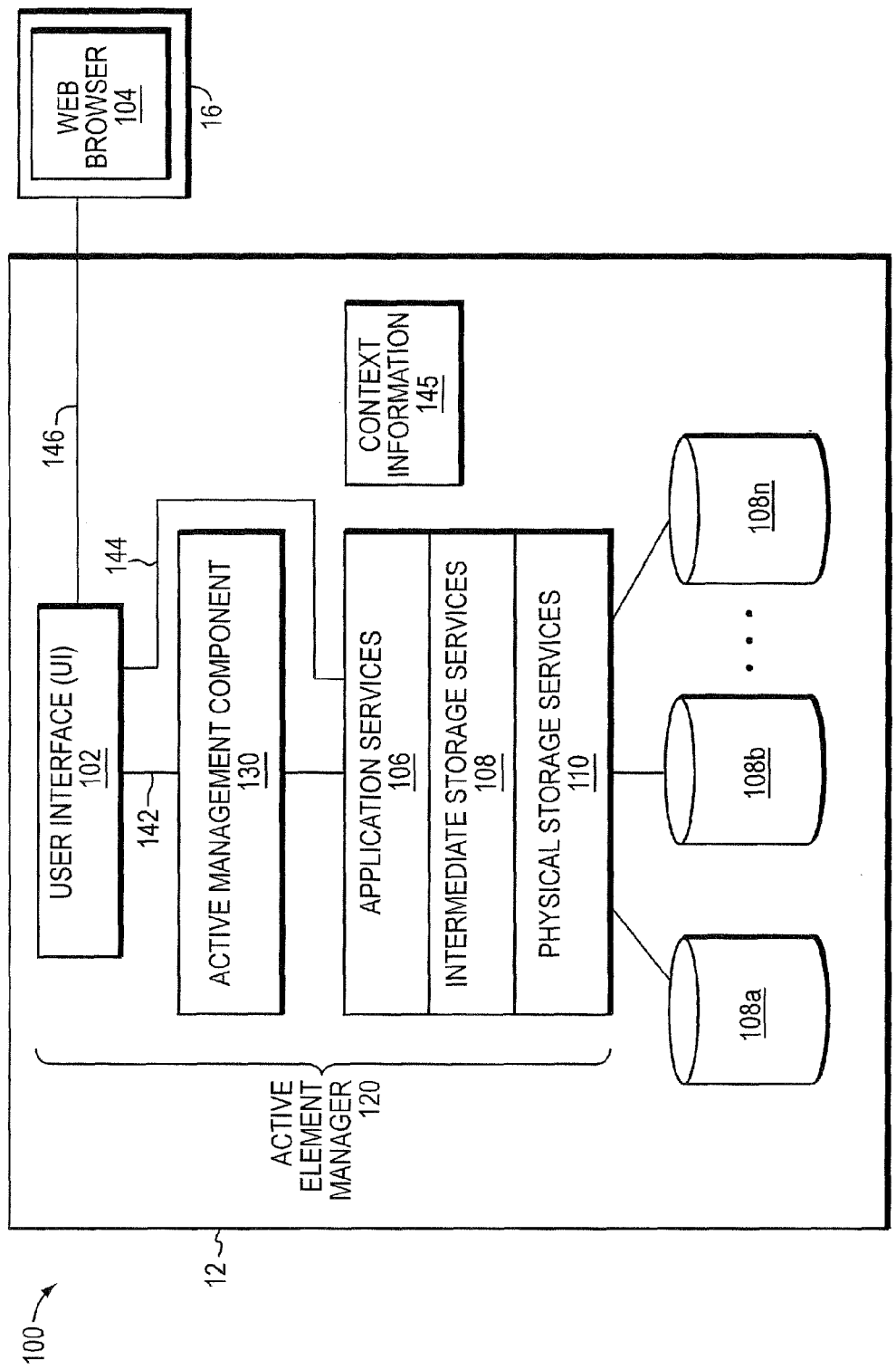
FIG. 2 is an example of components that may be included on the data storage system for use in performing the techniques herein.

Referring to FIG. 2, shown is an example of components that may be included on the data storage system 12 and the management system 16. The management system 16 may include a web browser 104 which is used when communicating with the active element manager (AEM) 120 of the data storage system 12. The AEM 120 may be used to perform operations in connection with management, configuration, monitoring, and the like, of the data storage system. For example, the AEM 120 may be used to provision storage used by any one or more different applications such as an email application, a database application, and file server, and the like. As described herein, the AEM 120 may also be used to facilitate interactions with environments and locations external to the data storage system 12 and management system 16, such as other computer network locations. In other words, the AEM 120 may be used to facilitate communications with other locations and environments external with respect to the data storage system environment in which the data storage system environment may include, for example, one or more data storage systems 12, the management system 16, a SAN, and the like.

The AEM 120 includes a user interface (UI) 102, an active management component 130, and one or more layers or levels of services, such as 106, 108 and 110, in connection with implementing a data storage request such as a data storage configuration request.

The user interface (UI) 102 may provide for one or more different types of user interfaces and associated data. For example, the UI 102 may provide support for a graphical user interface (GUI), command line interface (CLI), and the like, to support interactions between the data storage system 12 and the hosts 14*a*-14*n* of FIG. 1. The UI 102 may interact with other components on the data storage system in connection with communicating with a user. For example, the UI 102 may provide UI data (e.g., content or data used to populate the UI menus), and UI presentation or structure information (e.g., command organization or particular hierarchical menu structure) to another component such as the web browser 104 in connection with interacting with the user.

The active management component 130 may be used in connection with facilitating communications between the UI 102 and the different service layers 106, 108 and 110 when performing active element management operations. Active element management operations may be characterized as those involving interactions with environments and locations external to the data storage system environment. Such external environments and locations may include, for example, other network locations and websites as described elsewhere herein. The active management component 130 may facilitate a two-way communication flow of information to and/or from the external environments. The active management component 130 may gather context information 145 describing the current context and state of the data storage system with respect to the current user and operation being performed. The component 130 may gather such information included in 145 by communicating with other components on the data storage system 12, such as one or more of the service layers 106, 108 and 110. The component 130 may communicate the context information 145 to a target location in an external environment such as a target network location on the Internet. The component 130 may facilitate selecting, in accordance with the context information 145 of the data storage system, a target location in the external environment, such as an Internet website, and communicating the context information directly to the target location. The component 130 may also be used to facilitate communicating information received from the target location to the user.

In the example 100, the component 130 is represented as a single logical component. However, an embodiment may integrate the operations and functionality of the component 130 in the UI 102 and/or other components included in the AEM 120.

It should be noted that there are two paths 142 and 144 illustrated in FIG. 2. The path 142 may be used in connection with those operations involving interactions with environments external to the data storage system. The path 144 may be used when performing operations that do not involve such interactions with environments external to the data storage system 12 and management system 16. For example, the path 144 may be used in connection with performing a data storage configuration request issued by a user from the management system 16. The path 142 may be utilized if an operation or condition occurs involving the active management component 130 such as when the user requests connection to a website on the Internet for additional information and assistance with respect to an error that occurred as a result of the data storage configuration request.

In the example 100, the AEM 120 may include application services 106, intermediate or generic storage services 108, and physical storage services 110. In one embodiment, the user may interact with the UI communicating directly with any one of the different services 106, 108 and 110. In other words, a user may communicate directly with layer 106, 108 or 110. If a user provides an input request and/or data by directly communicating with one of the upper service layers, such as 106, the user request and/or data may be mapped to one or more lower service requests, such as by services of 106 communicating with services of 108 and/or 110 to implement the original input request. By connecting to the different service layers 106, 108 and 110, the UI may provide the user with exposure to different levels of abstraction in connection with performing data storage system management tasks. In one embodiment as described in more detail below, the different service layers may be in accordance with different levels of proficiency and knowledge with respect to performing data storage system management tasks for different applications.

The application services 106 may have an application-specific focus and provide a level of abstraction customized for an application such as, for example, a particular email application, law office application or medical office application, as well as a class of related applications, such as multiple email applications. The application services layer 106 may map the user provided inputs for use by the intermediate storage services 108. When a user interacts with the application services 106 for a particular application, the interface language may vary with the application. For example, if the application is a law office application, the interface language, menu options, and the like, may be tailored to the law profession. Similarly, a medical office application may utilize an interface language, menu options, and the like, familiar to the medical office. As such, the application services 106 may use one set of rules or mappings for each application to implement the application specific best practices for the user level. A first set of rules for the medical office application may be used to map the user input parameters using medical office terminology to parameters for the appropriate API calls for other services included in 108 and/or 110. A second set of rules for the law office application may be used to map the user input parameters using law office terminology to parameters for the appropriate API calls for other services 108 and/or 110. The user connecting to the data storage system at the application services 106 may be provided with a user interface customized for the selected level and application to perform a requested data storage configuration.

The intermediate storage services 108 may be an intermediate level. The application services 106 may communicate with the intermediate storage services 108 when implementing a request for data storage configuration. In one embodiment, a user connecting to the intermediate storage services 108 may be provided with a generic level of interaction which may not be tailored for the particular application. In other words, the same language and user interface may be presented to a user for multiple applications such as the medical application or law office application. As a variation to the foregoing, the intermediate storage services 108 may be customized for each application and provide for a more detailed level of exposure that varies per application.

The physical storage services 110 provide the most detailed or greatest level of exposure of the underlying data storage system. The physical storage services 110 may be customized for the particular storage vendor and associated options. The user interface for a user connected at to the physical storage services may include menu options and terms particular to the underlying storage vendor and the more knowledgeable user. For example, the user may specify particular devices, RAID levels and techniques, file types, SCSI and iSCSI terminology, and the like.

As an example in connection with a user making a data storage configuration request and communicating with the application services 106, the user may input data in connection with the request in an application specific context. For example, a user may make a data storage configuration request to configure data storage for a file system or email application. The data input by the user may be in the context of the particular application (e.g., a number of mailboxes, size of mailbox, storage group, and the like). The application-specific data received by the application services 106 may be mapped to one or more application-neutral or generic requests to the intermediate storage services 108. The intermediate storage services 108 may then make one or more calls to the physical storage services 110 to implement requests in the context of the physical storage devices 108a-108n, for example, for the particular data storage vendor and underlying hardware.

Software executed on the data storage system may provide for implementation of best practices for data storage configuration and data services in accordance with each particular application whose data is hosted on the data storage system. Such software may be included in the different service layers, such as 106, 108 and 110, of the AEM and are described in more detail in U.S. patent application Ser. No. 11/824,578, filed: Jun. 29, 2007, APPLICATION AWARE STORAGE, which is incorporated by reference herein. In such an embodiment using the different service layers, such as 106, 108 and 110 having an application-specific focus with each layer providing a different level of abstraction customized for each application, the UI may provide a user with different levels of exposure to information and requests when performing data storage system configuration tasks.

It will be appreciated by those skilled in the art that an embodiment may include different service layers in connection with performing the techniques described herein. For example, an embodiment of the AEM 120 may not incorporate services which have an application-specific focus and may not be characterized as application aware.

It should be noted that the example 100 is one possible embodiment of the components used in connection with the techniques herein. As illustrated in FIG. 2, the AEM 120 is included in the data storage system. In another embodiment using the techniques herein, the AEM 120 may be installed and execute on a host or other component connected to the data storage system. In yet another embodiment portions of the AEM 120, such as the UI 102 and/or one or more of the services 106, 108, 110 may be installed and execute on a host or other component connected to the data storage system.

Figure 3:
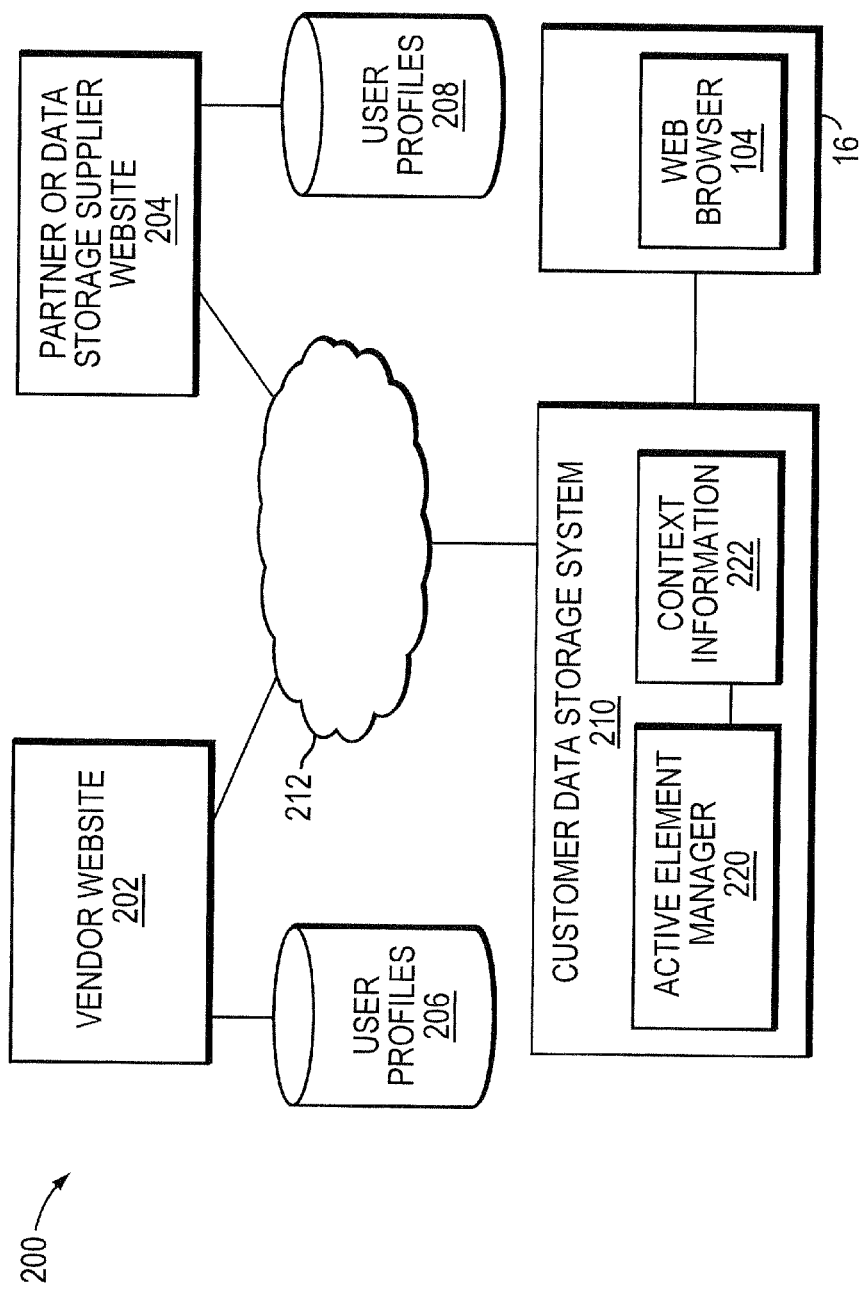
FIG. 3 is an example of a network that may include the data storage system utilizing the techniques herein.

Referring to FIG. 3, shown is an example 200 of a network in which the techniques herein may be performed. The example 200 includes a customer data storage system 210 connected to a network 212, such as the Internet, a vendor website 202 and a partner or data storage supplier website 204. The customer data storage system 210 may be a data storage system 12 as described elsewhere herein. The system 210 may include the AEM 220 which may generate the context information 222. A user may connect to the AEM 220 by logging in using a web browser 104 on the management system 16. As described herein, the data storage system 210 and management system 16 may be included in a data storage system environment. The data storage system 210 may be connected standalone to the network 212, may be included in a SAN, or other arrangement. The AEM 220 may be used in connection with producing the context information 222 and facilitating communication of the context information 222 to an external environment, such as one or more of the websites 202 and 204. Additionally, the AEM 220 may be used in connection with receiving information from the external environment and communicating the received information to the user, such as via the web browser 104.

The vendor website 202 may be a website of a data storage vendor or manufacturer, such as EMC Corporation. The partner or data storage supplier website 204 may be a website provided by a partner or data storage supplier. As an example, a partner or data storage supplier may be a distributor, reseller or VAR (Value added reseller) of the data storage systems of the vendor. In connection with examples provided herein, a particular partner or data storage supplier, such as a VAR, may be described for purposes of illustration and should not be construed as a limitation. As an example, a VAR may add additional hardware and/or software for use with the data storage system of a particular vendor and the VAR may sell the combination of the data storage system with VAR-added hardware and/or software to the customer. Each partner or data storage supplier may have a business relationship with the vendor or manufacturer of the data storage system. A customer may purchase a data storage system from one of the partners or data storage suppliers. As an example with respect to FIG. 3, the customer may purchase the data storage system 210 from a VAR. The VAR may provide an environment, such as a VAR website. The VAR website may be an illustrative example of website 204. The VAR website may include, for example, information on VAR hardware and software products, services, training and educational courses offered by the VAR, support for VAR-related products, VAR online store, VAR-sponsored user communities (e.g., using a particular application on a data storage system including VAR products), and the like. The website 204 may be provided by, and under the control of, the VAR or other partner. The vendor website 202 may be provided by, and under the control of, the data storage vendor or manufacturer. The vendor may provide website 202 for use by the vendor's partners. The vendor website 202 may include information regarding vendor supplied products, services, training, user communities, and the like, as may be included in the partner website 204 but, in contrast, may be vendor specific if included in 202. As will be described herein, the data storage system 210 may communicate, directly or indirectly, with the websites 202 and 204.

As described herein, the AEM 220 may be used in connection with configuring and management of the data storage system in the data storage system environment. The AEM may also be used to facilitate connecting the AEM on the data storage system with external environments along with context information from the data storage system.

As an example in connection with existing data storage systems not utilizing the AEM, a user may perform a data storage configuration operation, such as provision data storage for mailboxes in connection with an email application hosting data on the data storage system 210. An error may occur in connection with performing the data storage provisioning and the user may open up a new window or another web browser session. The user may manually enter a URL of a website which the user knows has additional information relevant to the provisioning task for the email application. If the user does not know the URL, the user may first perform a search, such as using an Internet search engine, to determine the correct URL. Once the user has the correct URL, the user may navigate to the URL for the website and perform queries at the website to gain additional information about how to handle the error encountered. In the foregoing, two tasks are performed: a first task in connection with the provisioning operation and a second task in connection with the subsequent search for additional information in connection with the error from the provisioning operation.

In connection with the AEM, the AEM may be used to automate the foregoing process and automatically connect the user to the correct website. Furthermore, the user may be connected to a particular page on the website. The context information of the data storage system on which the user encountered the error may be communicated to the target location, such as the website. The AEM may be used to obtain the relevant context information for use in connection with subsequent interactions between the user and the website to which the user is being connected. Additionally, the user may receive through the AEM additional information from the external environment of the target location. Thus, the AEM serves to facilitate automatically connecting the user to the appropriate external environment, providing the relevant context information to the target location of the external environment, and facilitating further communications between the data storage system 210 and the external environment.

The AEM 220 may be configured by the VAR or other partner selling the data storage system 210 to connect the user to the appropriate target location and external environment. For example, for errors occurring with VAR hardware and/or software, a customer may be automatically connected to the website 204 with the appropriate context information 222 for the data storage system as well as VAR hardware and/or software. If an error occurs with the data storage system having nothing to do with the VAR products, the customer may alternatively be connected to the vendor website 202. The customer may be directed to any one or more target locations at the external environment such as, for example, a virtual or online user community, a customer support agent, online store, and the like. As described herein, the user community may be characterized as a virtual community having a common interest. In connection with the techniques herein, there may be user communities focused on a particular vendor's hardware, combination of data storage system and application hosting storage therein, and the like. Members of the user community may exchange information regarding the common area of interest, for example, via a user community hosted at a website location. The user community may include user forums, blogs, various sources of technical information, and the like.

Included at each of the websites 202 and 204 may be, respectively, user profile data 206 and 208. The user profile data 206, 208 may be data gathered about the user, such as customer-related information about data storage systems purchased, license information, and data regarding current and previous interactions with the websites. In one embodiment, the set of user profile data 208 may be a master or aggregate copy of user profile data. The user profile data 206 may be collected for a time period, such as in connection with user interactions during the time period, and then provided to the website 204 for incorporation into the master user profile 208. A vendor providing the website 202 may perform such data gathering and forwarding of user profile data 206 as a service to its partners or suppliers having a website such as 204.

The context information 222 may describe, for example, an error received, the recent operations performed by the user leading up to the error, information about the current data storage configuration, the user ID (e.g., the user login identifier as provided in connection with authentication), and the like. The user profile 208 may include, for example, current licensing information, and a variety of different types of historical user data such as service calls, previous problems reported to an interactive customer support agent, previous purchases (via online or other), and the like.

The AEM 220 may collect and provide selected context information 222 in accordance with the particular problem or other current context related to the user's data storage system environment. The AEM 220 may be characterized as the launching point or connection point to the external environments and target locations (e.g., such as over a computer network) in which the AEM 220 facilitates the two-way flow of information between the data storage system and the external environment(s). The two-way information flow facilitated by the AEM may be used to enrich the data storage system customer's experience in a variety of different interactions such as, for example, related to support, e-commerce, virtual or online user communities, and the like, at one or more external environments, such as websites 202 and/or 204 as will be described in more detail elsewhere herein.

As one example, the data storage system 210 may directly communicate and interact with the partner website 204. In turn, the partner website 204 may communicate with the vendor website 202, for example, to retrieve information which is then provided to the customer. The website 204 may communicate with the website 202 to indirectly expose the customer to selected filtered portions of the website 204. For example, the data storage system 210 may communicate directly with the website 204 and the website 204 may expose particular portions of the website 202 to the customer. As another example, the data storage system 210 may directly communicate with both the websites 202 and 204 in accordance with the configuration of the AEM 220.

Figure 4:
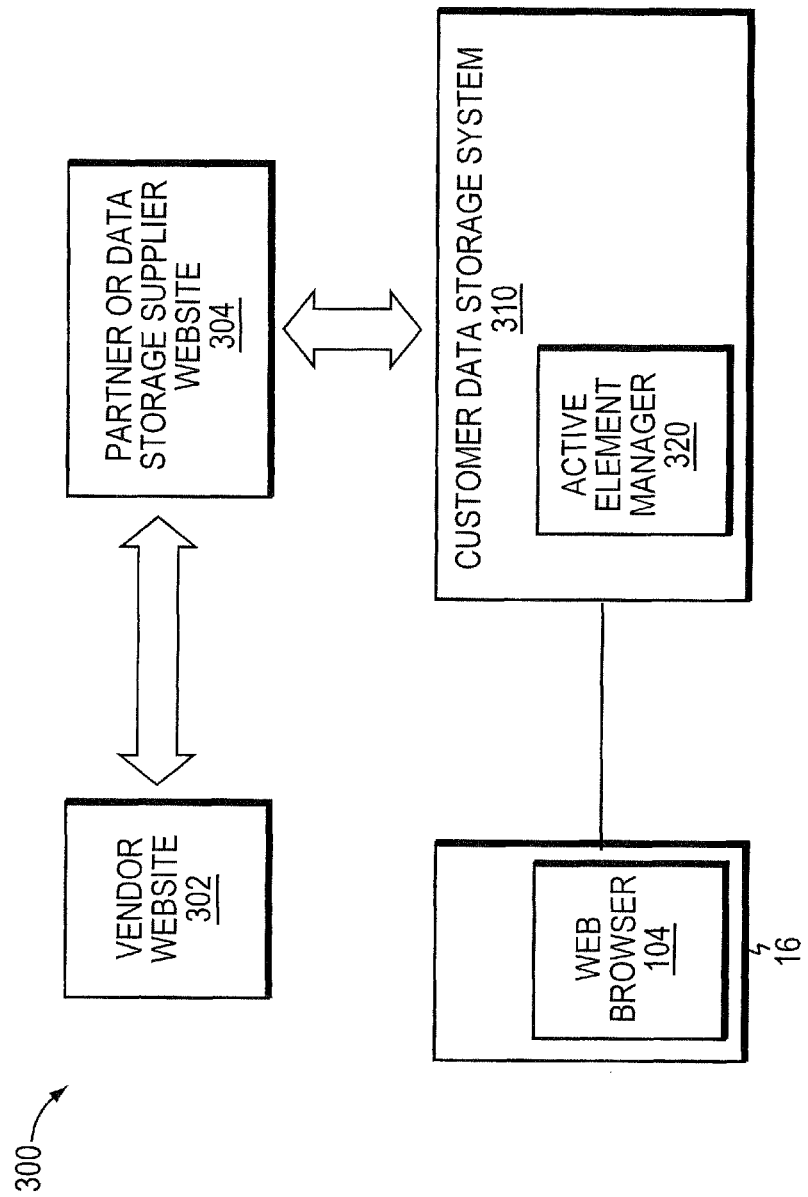
FIGS. 4 and 5 are examples illustrating data flow between the data storage system and external websites in connection with the techniques herein.

Referring to FIG. 4, shown is an example illustrating how information may flow in connection with the techniques herein. The example 300 illustrates a customer data storage system 310 which communicates directly with the partner or data storage supplier website 304, such as that under the control of a VAR. The website 304, in turn, may communicate with the vendor website 302, such as under the control of a data storage vendor or manufacturer having the VAR as a business partner. Information from the websites 302 and/or 304 may be communicated through website 304 to the data storage system 310. The data storage system 310 may include the AEM 320. A data storage system environment may include a management system 16 with a web browser 104 through which a customer uses to invoke and utilize the AEM 320 of the customer data storage system 310.

As an example, a VAR website may obtain selected technical information from different vendor websites dependent on the customer's data storage system. The VAR website may communicate with the appropriate vendor website to obtain the information which is then displayed to the customer via the AEM and web browser connected thereto. The customer may not be aware of the indirect communication between the VAR and vendor website.

Figure 5:
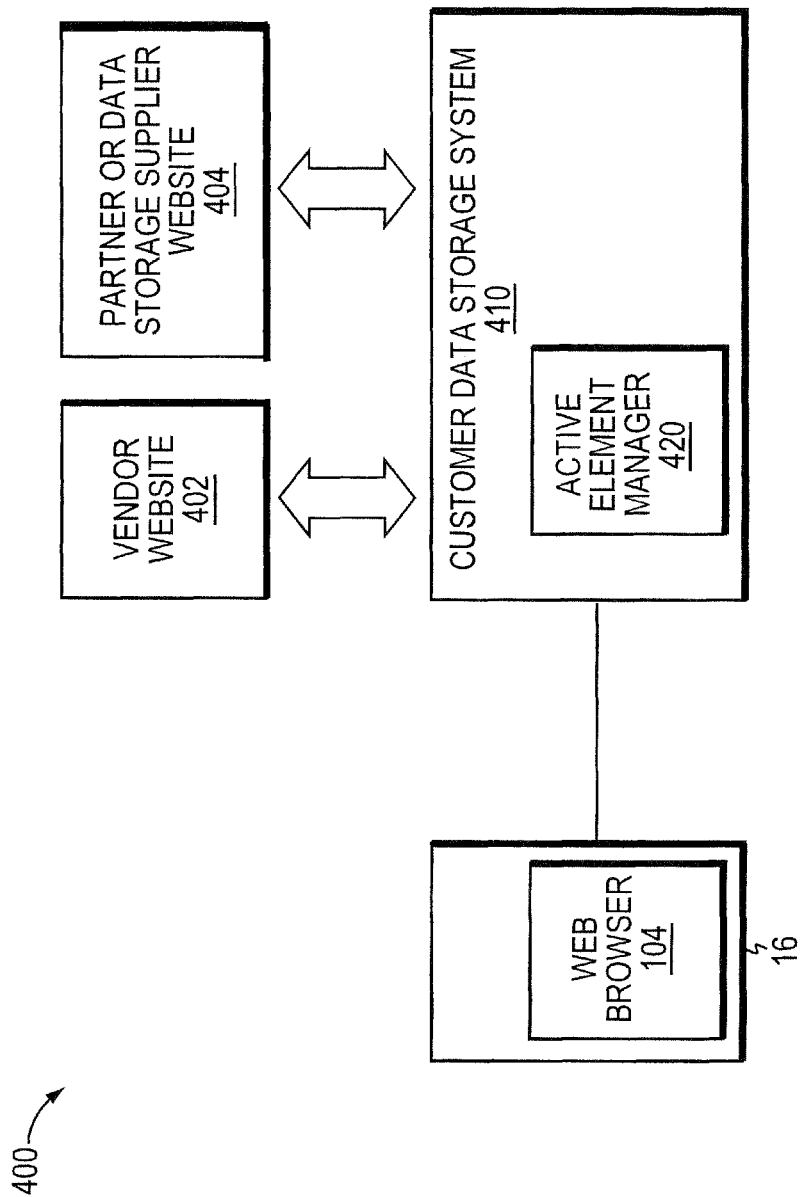

Referring to FIG. 5, shown is another example illustrating how information may flow in connection with the techniques herein. The example 400 illustrates a customer data storage system 410 which communicates directly with the partner or data storage supplier website 404, such as that under the control of a VAR. The data storage system 410 may also communicate directly with the vendor website 402, such as under the control of a data storage vendor or manufacturer having the VAR as a business partner. Information from the websites 402 and/or 404 may be communicated directly to the data storage system 410. The data storage system 410 may include the AEM 420. A data storage system environment may include a management system 16 with a web browser 104 through which a customer uses to invoke and utilize the AEM 420 of the customer data storage system 410.

It should be noted that information flow in connection with the customer data storage system as facilitated by the AEM may be a combination of that which is illustrated in FIGS. 4 and 5 as well as other variations. For example, the partner and/or vendor may each have one or more websites to which the customer data storage system may communicate depending on the particular context information and configuration of the AEM. The AEM may be configured by the partner to control the external environments and target locations therein to which the customer data storage system communicates. As illustrated elsewhere herein, the particular external environment and target location with which the data storage system communicates may vary with context information.

In connection with the techniques herein, context information may be information that is transmitted from the data storage system to a target location in an external environment. Information that is received by the data storage system may include user-relevant information determined, for example, by code executing on one of the partner and/or vendor websites. Other information that may be communicated between the data storage system and external environments may vary with particular user interactions. The foregoing is described in more detail in following paragraphs.

Figure 6:
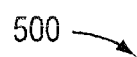
Figure 8:
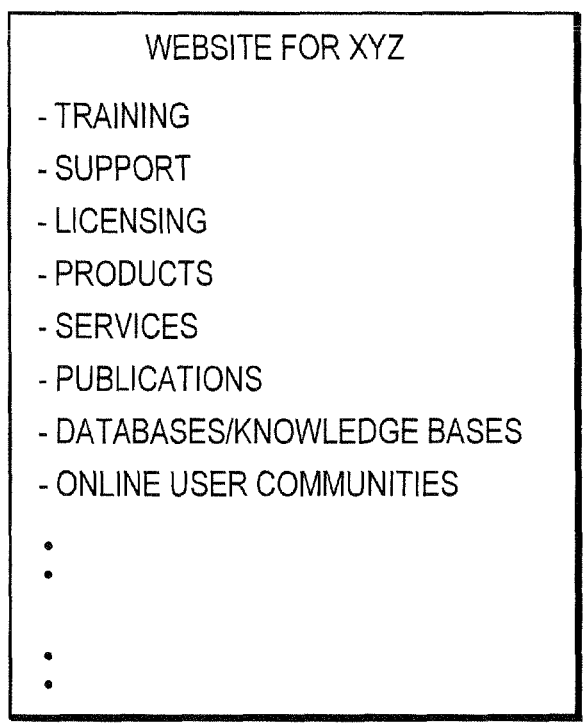
FIG. 8 is an example representing information that may be included at a vendor or partner website.

Referring to FIG. 6, shown an example representation of context information as may be collected by the AEM and transmitted to an external environment. The example 500 includes a data storage identifier 502, a user identifier 504, status information 506, application information 508 and data storage configuration information 510. The context information supplied by the AEM may be different than as described herein and vary with the particular AEM as well as the particular context to which the AEM is responding. For example, as described in FIG. 2, the AEM may have information regarding the particular applications which are hosting data on the data storage system. However, another embodiment may include an AEM which does not have information regarding the particular applications hosting data on the data storage system and, as such, application information 508 may be omitted in such an embodiment. As another example, the AEM may be installed on a data storage system supplied by a VAR. The data storage system may also include VAR-specific hardware and/or software. An error or other user action may occur involving VAR-specific hardware and/or software. As a result, additional information may be included in the context information related to the VAR-specific hardware and/or software. Such additional context information may include the name, version number, settings, options, and the like, for the VAR-specific products. The user may be directed to the VAR website all the time, or conditionally, such as when a VAR-specific component is involved in connection with the user inquiry, error, and the like, to which the AEM is responding. If there is an error which is not related to a VAR product, the AEM may omit any VAR-particular information and may connect the user to the vendor website directly, or indirectly through the VAR website.

Referring to FIG. 7, shown is a more detailed example of context information that may be transmitted from the AEM. The example 600 illustrates context information which is communicated in XML format. Element 602 includes a system identifier and user identifier. The system identifier of "12345" may be an identifier of the particular data storage system on which the AEM is included. The system identifier may identify the data storage system model as well as a particular instance of a data storage system manufactured or supplied. The user identifier "anne_s" may identify the user as logged onto the AEM. The user identifier may be used as an index into the user profile data, for example, as illustrated in FIG. 3 on the websites 202 and 204. Data may be stored per user as identified by each user identifier. The user identifier, along with other authentication information, may also be used to allow the data storage system including the AEM to connect to the external environment.

The field 604 may include status information, such as in the form of a status code and subcode, indicating the status of the data storage system. The field 604 may include a numeric encoding of an error condition or state of the data storage system, for example, resulting from the most recent user operations. In one embodiment, the data storage system including the AEM as well as the different external environments with which the AEM communicates may utilize a common message catalogue. The AEM may provide information in 604 which is also commonly understood by other external environments with which the AEM can communicate.

The field 605 may include information regarding the storage capacity of the data storage system and also the amount of available or free data storage. Such information may relate generally to the state of the data storage system and can be useful for a variety of different purposes as described herein, such as, for example, support and problem diagnostics and e-commerce.

The field 606 may identify the particular applications for which storage is being hosted on the data storage system identified by 602. The field 606 may identify, for example, the type of application, such as a general category as email applications, as well as name the application instance, such as Microsoft® Exchange Server.

The field 608 may include other data storage configuration information such as, for example, identifying the particular disk drive vendor, size, speed, location (e.g., slot number), status, and the like.

The information in various fields of FIG. 7 may describe the current configuration and associated state thereof. For example, field 605 conveys information regarding the data storage configuration (e.g., maximum capacity) as well the current state (e.g., amount of storage which is used or free). Similarly information of field 608 includes information about the data storage configuration (e.g., the disk types indicating vendor) as well as the current state of the data storage configuration (e.g., status of each disk).

Referring to FIG. 7A, shown is an example representation of the types of data that may be included in the user profile as maintained for each user identifier. User profiles are illustrated, for example, in FIG. 3 as elements 206 and 208. User profile information may include the user identifier 622, user contact information 624, license information 626, support and service contract information 628, service call and problem history 630, data storage information 632, website activity information 634, live chat support information 636, phone support information 638, and user community information 640. It should be noted that any portion of the information included in FIG. 7A as stored in connection with the user profile may be included in context information provided by the AEM. The particular portions included may vary with the particular connection, transaction and/or operation being performed by the AEM.

The user identifier 622 may be used as an index or identifier into the user profile information for each user. The user identifier 622 may be, for example, the identifier of 504 of FIGS. 6 and 602 of FIG. 7 as described elsewhere herein. The user contact information 624 may include complete name, address, phone, email, and other information used to contact the user identified by 622. The information in 624 may be used, for example, to customize and personalize interactions between the user and customer support personnel in interactions facilitated by the AEM via the partner and/or vendor website.

The license information 626 may describe the one or more licenses that the user has, for example, for the VAR or vendor software thereon. The license information may describe the license terms and provisions of the one or more licenses. For example, the license information 626 may indicate an expiration date, if any, for different software installed on the data storage system. The information in 626 may be useful, for example, in connection with facilitating e-commerce transactions to remind the user that a current license will expire, offer better or different license terms, and the like.

The support and service contract information 628 may include the level of support being provided to the user, such as by the partner. For example, the user may have purchased a contract for unlimited help support, a fixed fee for each problem inquiry, and the like. Information in 628 may be useful, for example, when the AEM is facilitating interactions between the user and online or telephone customer support interactions to indicate to the customer support personnel information on the relationship with the particular user.

The service call and problem history 630 may indicate a history of previous problems this user has had, the number of technician service calls dispatched to the customer's site by the partner and/or vendor, and the like. Such information may be useful in connection with subsequent interactions since the user may be experiencing the same or related problems.

The data storage information 632 may identify the particular hardware and/or software of the vendor and/or supplier. Such information may identify the hardware and/or software component name, version information, options and settings for configurations, storage capacity, and the like. The information in 632 may be useful, for example, in providing customer support, directing the user to information of interest, and in e-commerce transactions to notify the user regarding discounts on hardware/software of interest.

The website activity information 634 may identify recent user interactions and activities such as, for example, different electronic paper publications downloaded, different queries performed at the vendor and/or partner websites, and the like. The information in 634 may be useful, for example, in notifying the user of other information that may be of interest, indicating a level of proficiency of the user, and the like. For example, based on particular electronic publications downloaded or queries may at the vendor and/or partner website, it may be inferred that a user is a novice, or other level of proficiency with respect to a particular application and/or data storage system for data storage system management.

The live chat support information 636 may include a record of user interactions with online interactive help support. This may be useful in a manner similar as described in connection with 630 to provide a context for a current interaction since the current interaction for help may be a follow-up on a previous interaction for support assistance.

The phone support information 638 may include a record of user interactions with phone support. This may be useful in a manner similar as described in connection with 630 and 636 to provide a context for a current phone support interaction since the current phone support call may be a follow-up on a previous interaction for support assistance.

The user community information 640 may describe the membership and/or activities of the user identified in 622 for different online virtual user communities. For example, there may be virtual user communities for provisioning and management of data storage for a particular application on a particular vendor's data storage system. Examples of data that may be included in 640 are described elsewhere herein. Different virtual user communities focus on particular areas of interest, such as products of a vendor and/or VAR used with a particular application, Information included in the user profile may be used in connection with providing selected user-relevant information to the AEM from the partner and/or vendor website. The user-relevant information may be targeted or customized for the particular user in accordance with the user's profile information. The customized information may take a variety of different form using a variety of different technologies. For example, customized information may be pushed from the vendor and/or partner websites to the AEM in the form of notices, alerts, emails, and the like, notifying the user about the existence of different products, services, papers, virtual user communities, sales events, discounts, upgrades, new software and/or hardware, and the like, that may be of interest to the user.

Figure 9:
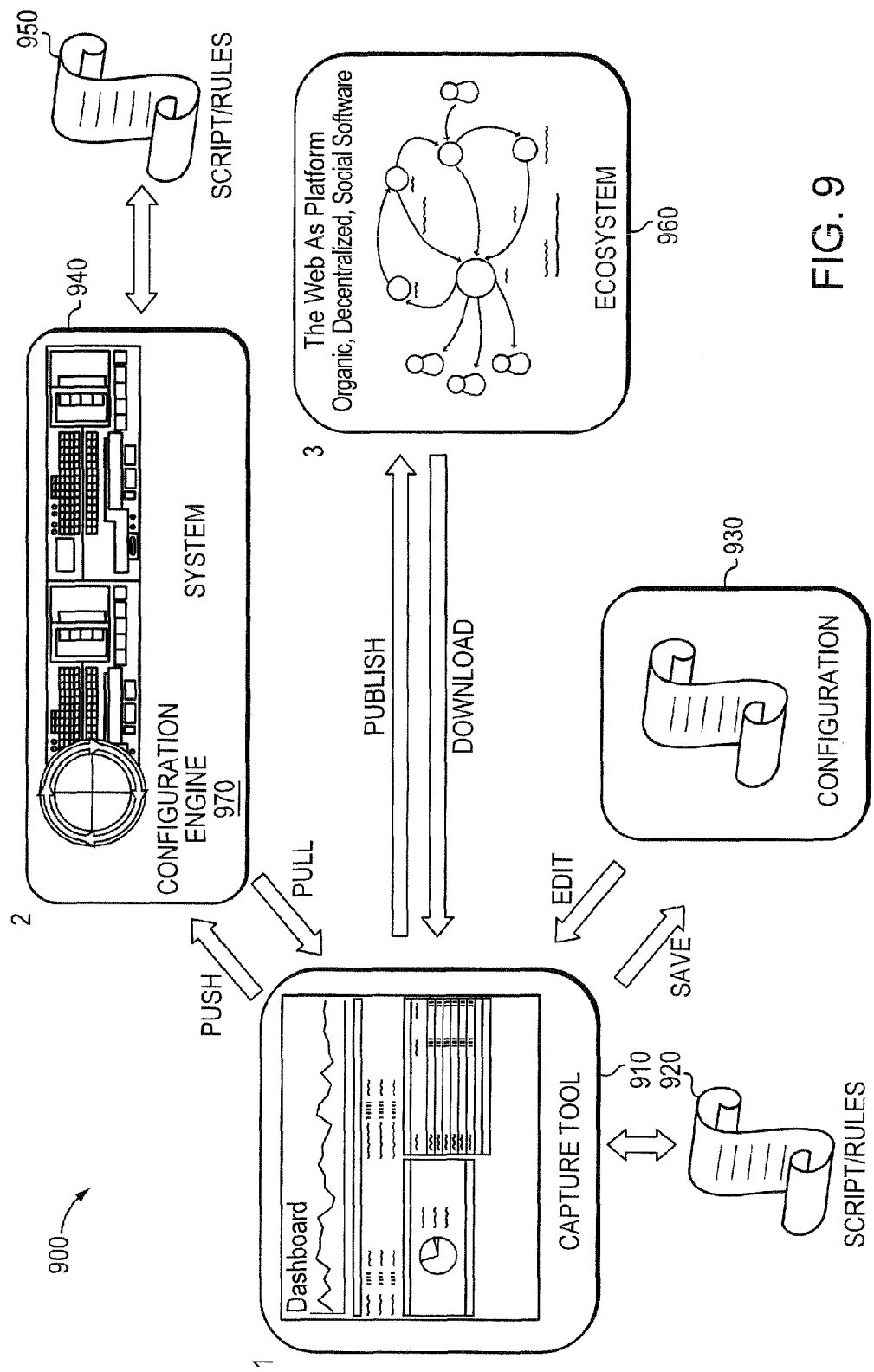
FIGS. 9-12 are block diagrams illustrating example uses of data storage system configuration information in accordance with techniques herein.

With respect to configuration information management, FIG. 9 illustrates an example system 900 in which the configuration information management technique may be used. In general, it is desirable to have configurations that are easy to create, modify, and install. For example, sometimes it is desirable to cause one or more storage systems to have the same or nearly the same configuration as an existing storage system; a partner may want to clone a successfully-deployed turnkey solution for the partner's application, or a quality assurance department may want to quickly configure systems for testing.

In accordance with at least some implementations of the configuration information management technique, configuration information may be obtained from a working system, configuration information may be checked to ensure that the configuration information corresponds to a valid configuration, and/or configuration information is modified. In some cases, only a small portion of the configuration information needs to be modified, e.g., a subset of fields may need unique values, while the rest of the configuration may be a black box.

In at least one implementation, it is easy to validate any changes before the configuration information is used for installation, in an automated system which runs on a destination site or network to help ensure resources exist, and to avoid problems such as address collisions. In at least one implementation, it is easy to upload new configuration information to a system and, to help avoid inadvertent or unintended changes when replacing or overlaying an existing configuration, checks, warnings, and/or prompts may be used, such as "Are you sure?", "Do you want to back up?", prompts to backup configuration and data, and warnings that there may be data loss, and it may be easy to revert the configuration.

Under conventional methods without use of the configuration management technique, manual configuration is often necessary, configuration is prone to error, often requires downtime, automation is via custom script only, trial and error is often needed, inflexible solutions are common, no "standard" solutions are available, prior configuration work by others cannot be relied upon, and a high learning curve is involved. In particular, under conventional methods without use of the configuration management technique, modifying configurations has some key disadvantages. Often, such conventional configuration is done manually, requiring a level of training and sometimes lengthy downtime. And, conventionally, if an operator makes a mistake, downtime increases and sometimes data is lost. Conventionally, partners and customers sometimes invest in writing their own scripts to automate configuration, but typically such scripts are very specific and do not apply to day-to-day changes. In the case of a new application, conventionally a new script needs to be written, which is labor-intensive, and like manual configuration, has trial-and-error problems. With respect to a general lack of "standard" solutions for common problems, conventionally if 25 customers want to deploy the same basic system with the same email application, there are 25 different ways of doing so—unless the customers pay someone to do the configuration for them.

By contrast, FIG. 9 illustrates an example system 900 in accordance with the configuration information management technique. Capture tool 910 is described further below and handles upload/download of configuration information such as configuration template 930 to/from data storage system 940 and ecosystem 960, and modification and validation of template 930. System 940 may be, include, or be included in one or more of systems 12, 210, 310, 410. Capture tool 910 may be implemented as a standalone application, as a web application from ecosystem 960 and/or system 940, and is aware of systems on the network with respect to discovery and authentication. Scripts/rules 920 are used to customize behavior, e.g., rules to make addresses unique and/or to conform to naming conventions.

Configuration engine 970 is further described below and is internal to storage system 940. Engine 970 generates configuration templates such as template 930 from running configurations such as an existing configuration of system 940, and provides only valid configuration information. Engine 970 enables upload and download of configurations, validates and installs potential new configurations, and works with system UI and capture tool 910.

Ecosystem 960, which may be, include, or be included in one or more of web sites 202, 204, 302, 304, 402, 404 and network 212, is used to distribute capture tool 910 and to distribute configuration templates such as template 930. In one or more implementations, such distribution may be partner specific and/or application specific, e.g., limited to the partner's own customers or to specified users or the application. Ecosystem 960 also allows users to upload their own configuration successes (e.g., "I have a great config for running XXX"), allows customer feedback on configurations, and may provide rewards or points for participation.

Depending on the implementation, system 900 can provide one or more of the following advantages. A simple, repeatable process can be provided for configuring systems such as system 940. A guided GUI reduces potential for error, and scripts/rules such as scripts/rules 920 help enable best-practice guidance/enforcement. Configuration capture using tool 910 helps reduce trial and error. System 900 allows offline configuration which reduces downtime for configuration changes. Sample configuration templates are available from the ecosystem, and a learning curve requirement is reduced, and solutions may be shared in a customer/partner community. Use of system 900 helps reduce install times, aids consistent, predictable performance, and helps enable incremental configuration changes. Running systems can be updated as well as new systems initialized. System 900 helps makes it efficient for power administrators to clone and deploy systems. In particular, in connection with delivery of system 940, configuration data can be pushed and/or pulled using tool 910, and system 940 can be configured to download a new configuration and update itself, or be provided with a new configuration via an external storage device (e.g., thumb drive).

In at least one implementation, configuration engine 970 is internal to system 940 and generates configuration information (e.g., template 930) on demand from its current configuration. Engine 970 is customizable with scripts/rules 950, and rule sets can be included or excluded. Configuration information such as template 930 can be consumed on demand. Access to engine 970 may be gained via AEM UI 102 or an API (e.g., tool 910).

The GUI may be provided as a client of configuration engine 970, and may be provided in one or more of multiple distributions, e.g., as a standalone desktop application, downloaded from ecosystem 960 or from a DVD, or as a web application. In at least one implementation, the GUI is configurable for system 940, includes authentication and identification, and system 940 may be selected from multiple data storage systems in a drop-down list. The GUI may have customizable behavior, e.g., may discover system 940 and then prompt for configuration information. Script/rules 950 assist with keeping IP addresses unique.

Template 930 of configuration information may have any of multiple formats, e.g., XML file, and may be uploaded to and/or downloaded from configuration engine 970 and ecosystem 960. Template 930 may be manually editable by experts and can be used to backup and/or restore configurations to help avoid having to re-do configuration work completely from scratch after a system failure.

Engine 970 facilitates obtaining a configuration from a working system, e.g., system 940, and helps enforce building the configuration on an actual system to verify that the configuration actually works. In at least some implementations, it is easy to modify the configuration and it is not necessary to make the whole configuration user visible; for example, a majority of the configuration may be implemented as a black box (e.g., binary data or a database). Template 930 may be implemented in any of multiple different ways such as a single file containing user-modifiable fields (e.g., .ini or xml format) so that a text editor or a simple GUI can be used to modify values.

Validation or verification software may be provided to help avoid creation, by changes or otherwise, of a configuration that is invalid, i.e., that violates policies or that will not execute properly on system 940 due to hardware limitations, incorrect software revision, address collision, unavailable host or networked resource, or another problem. In at least one implementation, the validation software can run standalone and on a customer storage network.

In at least some implementations, engine 970 provides a recovery mode option in the event configuration needs to be rolled back, and provides an initial configuration wizard option and a configuration menu option.

Figure 10:
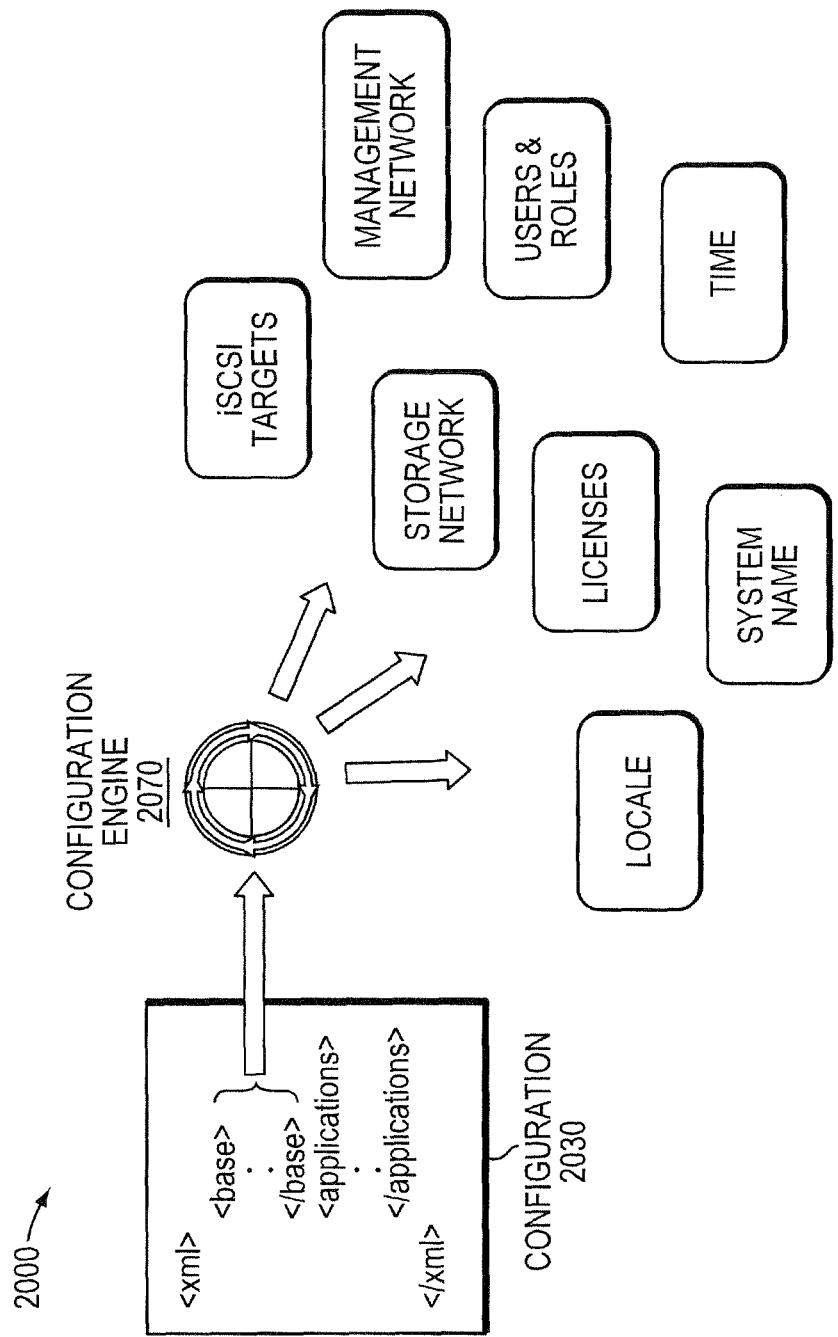

FIG. 10 illustrates an example 2000 of base configuration transformation in which a "base" section of configuration template 2030 is used to specify configuration goals for specific data storage attributes including iSCSI targets and licenses. In at least one implementation, the base configuration covers non-application-specific configuration information. That is, it specifies information that is used to configure common services that all hosts and applications would share on the storage system. Example template listing "Sample xml config" below shows an example of content of the base section.

Figure 11:
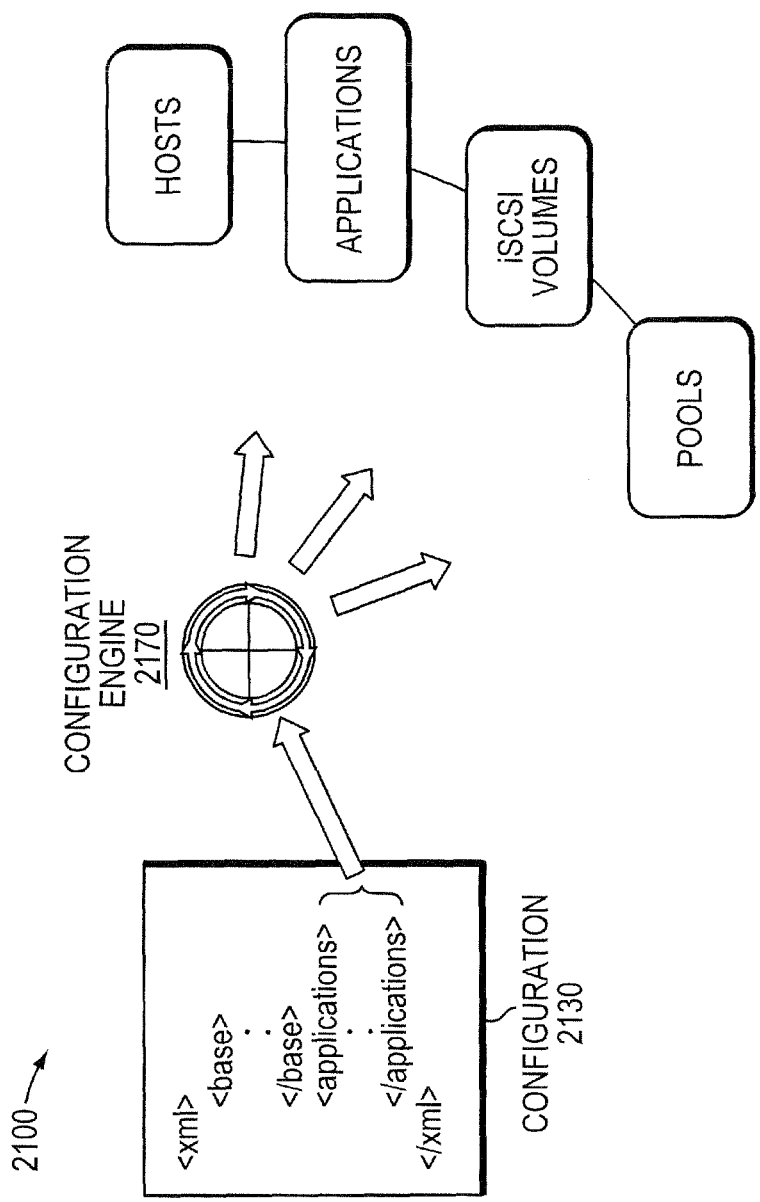

FIG. 11 illustrates an example 2100 of application configuration transformation in which an "application" section of configuration template 2130 is used to specify configuration goals for specific data storage attributes including hosts, applications including an email application, and storage pools. This part of the configuration is used to define the application-specific configuration information for one or more hosts and the storage that is served to them. In other words, it represents a set of configured assets that are deployed in the service of one specific application running on a host. There can be multiple sets, each set in service of one specific application. Example template listing "Sample xml config" below shows an example of content of the application section.

Figure 12:
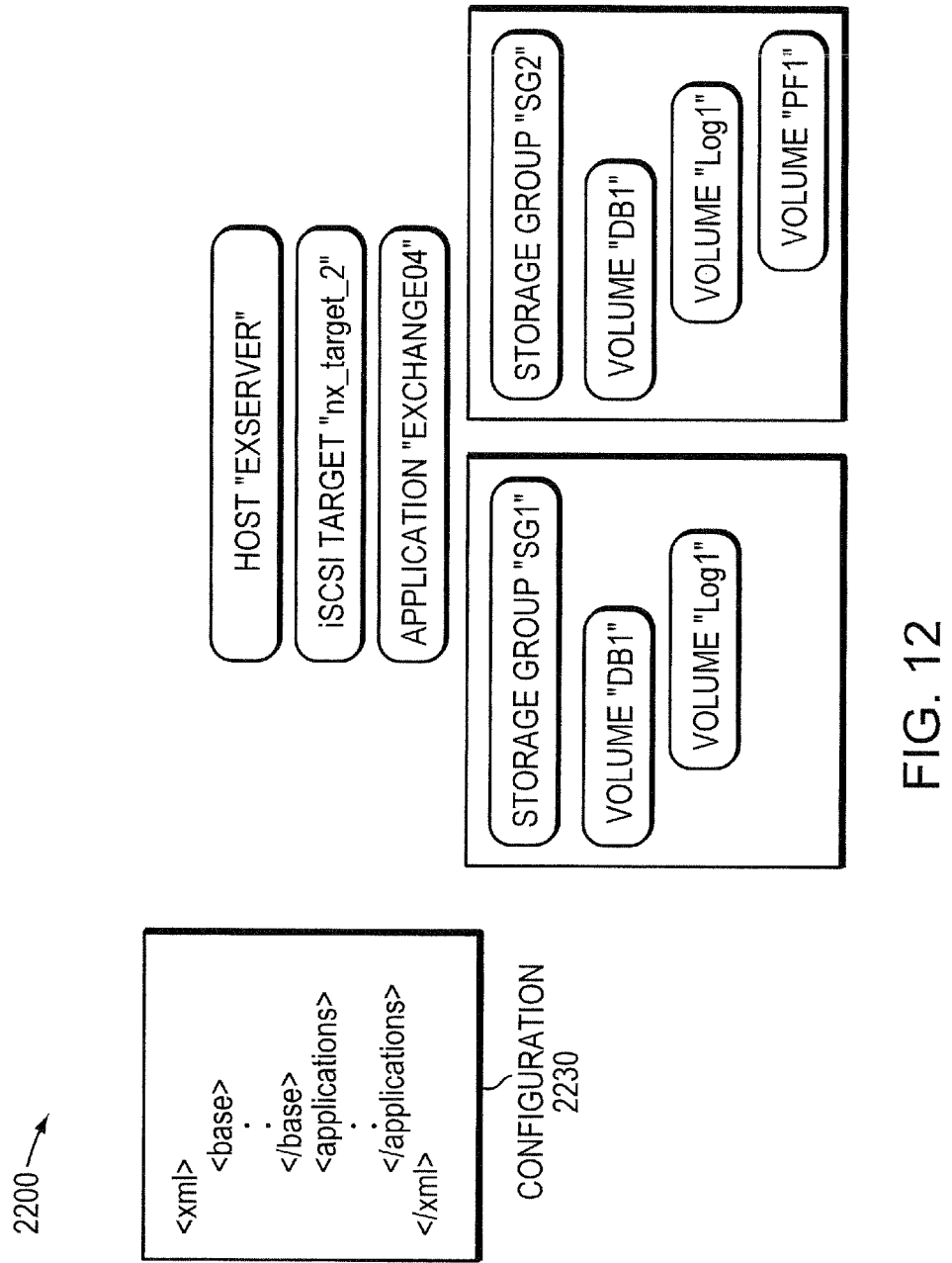

FIG. 12 illustrates an example 2200 of goal realization and provisioning subset in which configuration template 2230 is used to specify provisioning-related configuration goals for specific data storage attributes. This represents the details of a combination of the base configuration in FIG. 10 and one of the sets as described in FIG. 11. It shows a finer-level of detail on the storage objects, assets, and connectivity realized by the goals.

For example, the configuration information management technique allows a VAR who has a dental office or legal office application to tune the data storage system for the application and advertise this configuration via the ecosystem. Customers can use a GUI to download and apply the configuration. In a particular example, a VAR can ship unconfigured data storage systems to customers who can connect to the ecosystem, and the VAR can thereby provide the configuration for the VAR's application.

If a data storage setting requires two data storage systems that are identical except for IP addresses, a configuration can be derived from one of the systems, slightly modified offline, and downloaded into the other system.

A generic configuration can be created by deriving a configuration template from a running system and removing proprietary information (e.g. IP addresses), and then the generic configuration can be published as a general purpose solution on the ecosystem.

In an example with respect to script/rules 920, 950, such rules may be used to prevent creation of a volume of an unsupported size, and then when the system is updated to support the size, the rules may be updated to correspond, and tool 910 and engine 970 need not be changed. Depending on the implementation, the updated rules may be delivered via an automatic update service. In general, in at least some cases, tight control over changes to a configuration template are needed to help prevent driving the storage system into a configuration that is hobbling or disabling to one or more important functions of the storage system.

In at least one implementation, engine 970 parses the entire template 930 and performs its own ordering of configuration tasks before driving the configuration onto the storage system.

The configuration template may be or include a set of goals that define how the system should look this way when configuration is done. Engine 970 may use script/rules 950 to create steps to achieve the goals and then execute the steps in a suitable order. Depending on the case, the goals may be very high level or may be specific best practice storage system settings, e.g., cache size=4 mb.

In at least some cases, the goals are platform independent so that different types of storage systems can potentially use the same configuration template, and each type of storage system is responsible for providing a configuration engine compatible with the template and capable of implementing the template on the storage system to the extent supported by the storage system.

Example methods or techniques for use in operating engine 970 in accordance with template (schema) 930 are described in U.S. patent application Ser. No. 11/393,545, filed 30 Mar. 2006, SCRIPT LANGUAGE FOR STORAGE MANAGEMENT OPERATIONS, Krishnan et el., which is hereby incorporated herein by reference in its entirety.

The following is a listing of a sample template labeled "Sample xml config", e.g., for use as template 930:

```
<!-- Sample xml config -->
<?xml version="1.0"?>
<configuration>
   <summary>
      <author>Lastname, Firstname</author>
      <title>Microsoft Exchange 2009 Storage</title>
      <version>1.01.002</version>
```

```
        <date>Wed Aug. 26 18:39:52 UTC 2009</date>
        <description>Configuration description for Microsoft Exchange
2009 Storage.</description>
    </summary>
    <base>
        <name>storage4u</name>
            <model>NXnn</model>
            <serialnumber>xxxxxxxxxxxxxxxx</serialnumber>
            <description>Lab 4, bottom stairwell</description>
            <language>English-NA</language>
<network>
    <!-- The network configuration for the storage -->
    <!-- system.                                   -->
    <dns ip=x.x.x.x>
    <ntp ip=x.x.x.x >
    <mgmtportals>
        <mgmtportal id=0>
            <ip> x.x.x.x </ip>
            <subnet>255.255.255.0</subnet>
            <gateway> x.x.x.x </gateway>
        </mgmtportal>
    </mgmtportals>
    <storagetargets>
        <storagetarget id=0>
            <servername>nx_target_2</servername>
            <ip> x.x.x.x </ip>
            <subnet>255.255.255.0</subnet>
            <gateway> x.x.x.x </gateway>
            <iqn>iqn.1992-05.com.emc:xxxxxxxxxxxxxxx-1</iqn>
        </storagetarget>
    </storagetargets>
</network>
<users>
    <!-- The users we want the storage system to   -->
    <!-- know about.                               -->
    <user name=admin>
        <role>administrator</role>
            <description>User will have access to all administrative and
management interfaces and data.</description>
    </user>
    <user name=mgr>
        <role>manager</role>
            <description>User will be able to see all storage system data
and perform all storage management operations.</description>
    </user>
</users>
<licenses>
    <!-- The licenses we want to install on the    -->
    <!-- storage system.                           -->
    <license id=NXnn_Exchange_1.0>
        <issued>9/08/2006</issued>
            <key>xxxxxxxxxxxxxxxxxxxxxxxx</KEY>
    </license>
    <license id=NXnn_antivirus_2.1>
        <issued>9/08/2006</issued>
            <key>xxxxxxxxxxxxxxxxxxxxxxxx</KEY>
    </license>
</licenses>
</base>
<applications>
    <hosts>
    <!-- The hosts we want the storage system to   -->
    <!-- know about.                               -->
    <host id=0>
        <name>exserver</name>
        <os>Windows Server 2009</os>
            <iqn>iqn-0000000000001</iqn>
        </host>
    </hosts>
    <!-- bottom-pyramid Exchange specification     -->
    <!-- this configuration will use best practices -->
    <!-- to create the appropriate configuration   -->
    <!-- based on inputs of mailbox and size.      -->
    <application id=0>
        <name>Exchange00</name>
        <description>Exchange mailboxes and
public folders</description>
            <mailboxes>1200</mailboxes>
    <avemailboxsize>2 GB</avemailboxsize>
        <hosts>
            <host>
                <name>exserver</name>
                <access>storagegroup</access>
            </host>
        </hosts>
        <protection size=1000 GB>
    </application>
    <!-- top-pyramid Exchange specification.       -->
    <!-- this goal would result in the creation    -->
    <!-- of a second Exchange application with some -->
    <!-- specific characteristics instead of using -->
    <!-- built-in best practices.
<application id=1>
        <name>Exchange04</name>
        <description>Exchange mailboxes and public folders</description>
        <storagegroups>
            <storagegroup id=0>
                <name>SG1</name>
                <description>This is the description</description>
                <virtualdisks>
                    <virtualdisk id=0>
                        <name>DB1</name>
                        <description>database LUN</description>
                        <size>125 GB</size>
                        <pool>database</pool>
                <hosts>
                    <host id=0>
                        <name>exserver</name>
                        <access>storagegroup</access>
                    </host>
                </hosts>
                </virtualdisk>
                <virtualdisk id=1>
                    <name>LOG1</name>
                    <description>Log LUN</description>
                    <size>25 GB</size>
                    <pool>log</pool>
                <hosts>
                    <host id=0>
                        <name>exserver</name>
                        <access>storagegroup</access>
                    </host>
                </hosts>
                </virtualdisk>
                </virtualdisks>
            </storagegroup>
            <storagegroup id=1>
                <name>SG2</name>
                <description></description>
                <virtualdisks>
                    <virtualdisk id=0>
                        <name>DB1</name>
                        <description>database LUN</description>
                        <size>125 GB</size>
                        <pool>database</pool>
                <hosts>
                    <host id=0>
                        <name>exserver</name>
                        <access>storagegroup</access>
                    </host>
                </hosts>
                </virtualdisk>
                <virtualdisk id=1>
                    <name>LOG1</name>
                    <description>Log LUN</description>
                    <size>25 GB</size>
                    <pool>log</pool>
                <hosts>
                    <host id=0>
                        <name>exserver</name>
                        <access>storagegroup</access>
                    </host>
                </hosts>
                </virtualdisk>
                <virtualdisk id=2>
                    <name>PF1</name>
                    <description>Public Folders LUN</description>
                    <size>1000 GB</size>
```

-continued

```
        <pool>database</pool>
      <hosts>
        <host id=0>
          <name>exserver</name>
          <access>storagegroup</access>
        </host>
      </hosts>
          </virtualdisk>
        </virtualdisks>
      </storagegroup>
    </storagegroups>
    <hosts>
      <host>
        <name>exserver</name>
        <access>storagegroup</access>
        </host>
      </hosts>
      <protection size=1000 GB>
    </application>
  </applications>
</configuration>
```

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in processing data storage system configuration information, the method comprising:
   using a capture tool to automatically create a template from a configuration of a first physical data storage system, wherein the capture tool is enabled to modify and validate the template, wherein the template includes non-application specific information to specify configuration goals for specific data storage attributes including iSCSI (internet small computer system interface) targets and licenses and application specific information to specify configuration goals for specific data storage attributes including hosts, applications and storage pools;
   publishing the template such that the template is advertised as available on an ecosystem, wherein the ecosystem is configured to store and distribute templates including best practice templates, wherein the data storage system is aware of other systems in the ecosystem;
   using the capture tool to identify and download a template from the ecosystem to the data storage system and upload a template from the data storage system to the ecosystem, wherein the capture tool is aware of other data storage systems in the ecosystem; and
   using a configuration engine to apply the template to configuring a second physical data storage system.

2. The method of claim 1, further comprising:
   controlling operation of the configuration engine by a script.

3. The method of claim 1, further comprising:
   using the configuration engine to cause the second data storage system to have a same configuration as the first data storage system.

4. The method of claim 1, further comprising:
   obtaining configuration information from a working system; and
   checking whether the configuration information corresponds to a valid configuration.

5. The method of claim 1, further comprising:
   validating changes before configuration information is used for installation;
   in an automated system running on a destination site, helping to ensure resources exist; and
   avoiding address collisions.

6. The method of claim 1, further comprising:
   using a prompt to help avoid inadvertent changes when replacing an existing configuration.

7. The method of claim 1, further comprising:
   using the capture tool to handle upload/download of configuration information to/from data storage system and an ecosystem, and modification and validation of the template.

8. The method of claim 1, further comprising:
   using an ecosystem to distribute the capture tool and to distribute configuration templates.

9. The method of claim 1, further comprising:
   distributing the capture tool and configuration templates on a partner specific basis.

10. The method of claim 1, further comprising:
    distributing the capture tool and configuration templates on an application specific basis.

11. The method of claim 1, further comprising:
    allowing users to upload their own configurations; and
    allowing customer feedback on configurations.

12. The method of claim 1, further comprising:
    making sample configuration templates available from an ecosystem.

13. The method of claim 1, further comprising:
    generating configuration information on demand from a current configuration.

14. The method of claim 1, further comprising:
    customizing the configuration engine with rules; and
    excluding rule sets.

15. The method of claim 1, further comprising:
    allowing the template to be manually editable by experts and to be used to backup configurations.

16. The method of claim 1, further comprising:
    avoiding making the whole configuration visible to a user.

17. The method of claim 1, further comprising:
    providing the template as a single file containing user-modifiable fields so that a text editor can be used to modify values.

18. A system for use in processing data storage system configuration information, the system comprising:
    first hardware logic configured to use a capture tool to automatically create a template from a configuration of a first physical data storage system, wherein the capture tool is enabled to modify and validate the template, wherein the template includes non-application specific information to specify configuration goals for specific data storage attributes including iSCSI (internet small computer system interface) targets and licenses and application specific information to specify configuration goals for specific data storage attributes including hosts, applications and storage pools;
    second hardware logic configured to publish the template such that the template is advertised as available on an ecosystem, wherein the ecosystem is configured to store and distribute templates including best practice templates, wherein the data storage system is aware of other data storage systems in the ecosystem;
    third hardware logic configured to use the capture tool to identify and download a template from the ecosystem to the data storage system and upload a template from the data storage system to the ecosystem, wherein the capture tool is aware of other data storage systems in the ecosystem; and fourth hardware logic configured to use a configuration engine to apply the template to configuring a second physical data storage system.

19. The system of claim 18, further comprising:

fifth hardware logic configured to control operation of the configuration engine by a script.

20. The system of claim 18, further comprising:

sixth hardware logic configured to use the configuration engine to cause the second data storage system to have a same configuration as the first data storage system.

\* \* \* \* \*